United States Patent
Lonardi et al.

(10) Patent No.: US 6,981,831 B2
(45) Date of Patent: Jan. 3, 2006

(54) VARIABLE DEVICE FOR BULK MATERIAL DISTRIBUTION WITH ROTARY CHUTE HAVING VARIABLE ANGLE OF INCLINATION

(75) Inventors: Emile Lonardi, Bascharage (LU);
Emile Breden, Luxembourg (LU); Guy Thillen, Diekirch (LU); Giovanni Cimenti, Bertrange (LU)

(73) Assignee: Paul Wurth S.A., Luxembourg (LU)

( * ) Notice: Subject to any disclaimer, the term of this patent is extended or adjusted under 35 U.S.C. 154(b) by 330 days.

(21) Appl. No.: 10/380,977

(22) PCT Filed: Aug. 27, 2001

(86) PCT No.: PCT/EP01/09830

§ 371 (c)(1),
(2), (4) Date: Mar. 20, 2003

(87) PCT Pub. No.: WO02/24962

PCT Pub. Date: Mar. 28, 2002

(65) Prior Publication Data

US 2003/0180129 A1 Sep. 25, 2003

(30) Foreign Application Priority Data

Sep. 20, 2000 (LU) .................................. 90642

(51) Int. Cl.
*B65G 11/00* (2006.01)
(52) U.S. Cl. .................... 414/174; 414/301; 432/96

(58) Field of Classification Search ................ 414/150, 414/172, 174, 195, 299, 300, 301; 432/96
See application file for complete search history.

(56) References Cited

U.S. PATENT DOCUMENTS

| | | | |
|---|---|---|---|
| 4,525,120 A | 6/1985 | Legille et al. | |
| 4,547,116 A * | 10/1985 | Legille et al. | 414/160 |
| 5,022,806 A * | 6/1991 | Lonardi et al. | 414/208 |
| 5,799,777 A * | 9/1998 | Mailliet et al. | 198/642 |
| 6,213,275 B1 * | 4/2001 | Lonardi et al. | 193/16 |
| 6,857,872 B2 * | 2/2005 | Lonardi et al. | 432/96 |

FOREIGN PATENT DOCUMENTS

EP 1001039 5/2000

* cited by examiner

Primary Examiner—Thomas J. Brahan
(74) Attorney, Agent, or Firm—McCormick, Paulding & Huber LLP (57) ABSTRACT

A device for distributing bulk materials includes a suspension rotor is mounted in a support frame which is capable of rotating about a substantially vertical axis of rotation. A chute is suspended to the suspension rotor and is tiltable about a substantially horizontal tilt axis. A first motor is capable of rotating the suspension rotor about its axis of rotation in a first direction, and a tilt controlling motor mounted in the support frame is capable of rotating about a substantially vertical axis of rotation. A tilting mechanism is also connected between the chute and the tilt controlling rotor, while a first braking device exerts a braking moment on the tilt controlling motor. A first control device controls the angle of inclination of the chute by controlled braking of the tilt controlling rotor.

24 Claims, 4 Drawing Sheets

VARIABLE DEVICE FOR BULK MATERIAL DISTRIBUTION WITH ROTARY CHUTE HAVING VARIABLE ANGLE OF INCLINATION

CROSS-REFERENCE TO RELATED APPLICATIONS

This application is entitled to the benefit of and incorporates by reference in their entireties essential subject matter disclosed in International Application No. PCT/EP01/09830 filed on Aug. 27, 2001 and Luxembourg Patent Application No. 90642 filed on Sep. 20, 2000.

FIELD OF THE INVENTION

The present invention relates to a device for distributing bulk materials with a rotary chute with a variable angle of inclination.

More specifically, it relates to such a device comprising a support frame, a chute for distributing bulk materials, a suspension rotor and a tilt controlling rotor, as well as a tilting mechanism. The chute is suspended to the suspension rotor so as to be tiltable about a substantially horizontal tilt axis. The tilting mechanism is connected between the chute and the tilt controlling rotor in order to transform a differential rotation of the suspension rotor and of the tilt controlling rotor into a variation of the angle of inclination of the chute between two extreme positions.

BACKGROUND OF THE INVENTION

Such a device is known for example from U.S. Pat. No. 3,693,812. In this device, both rotors are rotated via a planetary gear box. From this planetary gear box, emerge: (1) a main input shaft; (2) a secondary input shaft; (3) a first output shaft, called rotary shaft hereafter; and (4) a second output shaft, called tilt controlling shaft hereafter. The main input shaft is rotated by a driving motor. A demultiplying mechanism connects the main input shaft to the rotary shaft. The latter penetrates into the support frame where it engages by means of a pinion with a toothed ring of the suspension rotor. The tilt controlling shaft itself also penetrates into the support frame, where it engages by means of a pinion with a toothed ring of the tilt controlling rotor. The planetary gear box further comprises: a horizontal annular toothed wheel, which engages at its external perimeter with a pinion of the rotary shaft; a solar wheel which is borne by the secondary input shaft; at least two satellite pinions, which engage with the internal perimeter of the annular toothed wheel and the solar wheel; and a satellite pinion carrier, which engages with a toothed wheel of the tilt controlling shaft. These gears are dimensioned so that both output shafts have the same speed of rotation when the secondary input shaft is not rotating. A control motor with a reversible direction of rotation is connected to the secondary input shaft of the planetary gear. By driving this control motor in a first direction, the chute is tilted in a first direction and by driving it in the reverse direction, the chute is tilted in the reverse direction. The speed of rotation of the control motor determines the tilt speed of the chute, regardless of the speed of rotation of the chute. By blocking the secondary input shaft by means of a brake, a strictly constant angle of inclination is provided for the rotating chute.

It will be noted that this planetary gear box is a key piece of equipment of the device for distributing bulk materials. This is a special design which accounts for a large portion of the price of the device. Further, in order to remain operational when the driving unit requires servicing or a major repair, a complete planetary gear box should be kept in reserve.

OBJECTS AND SUMMARY OF THE INVENTION

The object of the present invention is to provide a device for distributing bulk materials of the type described above, with a simpler driving mechanism, notably causing less problems in the case of major servicing or repairs.

According to the invention, this object is achieved by a device for distributing bulk materials comprising—in a known way per se—a support frame, a chute for distributing the bulk materials, a suspension rotor, a tilt controlling rotor and a tilting mechanism. Both rotors are mounted on the support frame so that they are both capable of rotating about a substantially vertical axis of rotation. The chute is suspended to the suspension rotor, so as to be tiltable about a substantially horizontal tilting axis. The suspension rotor (and consequently the chute) can be driven with a first motor in a first direction about its axis of rotation. The tilting mechanism is connected between the chute and the tilt controlling rotor, in order to transform a differential rotation of the suspension rotor and of the tilt controlling rotor into a variation of the angle of inclination of the chute between two extreme positions. According to a first aspect of the present invention, the chute is balanced in order to return to a first of its two extreme positions, while accelerating the tilt controlling rotor via the tilting mechanism in the direction of rotation of the suspension rotor. In this embodiment, a first braking device is associated with the tilt controlling rotor so that it is capable of exerting a braking moment on the tilt controlling rotor. With this first braking device is associated a first control device which allows the tilting of the chute to be controlled by controlling the braking moment applied to the tilt controlling rotor, when the suspension rotor is driven in the first direction of rotation. If the braking moment exerted on the tilt controlling rotor is equal to the moment required for maintaining the chute in an equilibrium position, the chute remains fixed in tilt. If the braking moment exerted on the tilt controlling rotor is larger than the moment required for maintaining the chute in the equilibrium position, the chute moves away from its first extreme position of inclination. If the braking motor exerted by the tilt controlling rotor is less than the moment required for maintaining the chute in the equilibrium position, the chute moves closer to its first extreme position of inclination, because its special balancing causes an acceleration of the tilt controlling rotor relatively to the suspension rotor. In the three cases, the first motor must of course develop a driving moment which is larger than the braking moment of the tilt controlling rotor, while providing a substantially constant speed of rotation. It remains to be noted that for providing the balance of the chute which ensures its return to a first of its two extreme positions, it is possible to either involve the weight of the chute exclusively or resort to counterweights or springs or other components capable of storing potential energy when the chute is tilted in one direction and of releasing it when the chute should be tilted in the reverse direction. As a conclusion, by associating the tilt controlling rotor with a simple braking device having a controllable braking moment, the angle of inclination of the chute as well as its tilting speed can be controlled, when the latter rotates in a first direction.

In order to provide rotation of the chute with a strictly constant angle of inclination without having to continually brake the tilt controlling rotor, a clutch transmission mechanism can be connected between the suspension rotor and the tilt controlling rotor. In the engaged position, this mechanism makes both rotors interdependent in rotation, i.e. provides a same speed or rotation for both rotors, whereas in the disengaged position of the clutch, the mechanism provides acceleration, deceleration of one rotor relatively to the other, respectively. In other words, after having set a particular angle of inclination of the chute by varying the braking moment of the tilt controlling rotor with the transmission mechanism disengaged, the transmission mechanism can be engaged in order to mechanically set the angular shift of both rotors and thus provide a strictly constant angle of inclination of the chute without having to spend any energy for this purpose.

If the intention is not to be limited to one direction of rotation for the chute or to be able to adjust the angle of inclination of the chute when the latter is rotationally fixed, a second motor must be associated with the tilt controlling rotor so as to be capable of driving the latter about its axis of rotation in a second direction of rotation, and a second braking device must be associated with the suspension rotor so that as to be capable of exerting a braking moment on the suspension rotor. A control device which is associated with the second braking device, provides in this case control over the variation of the angle of inclination of the chute rotating in the second direction, by changing the braking moment of the suspension rotor. In order to provide a strictly constant angle of inclination of the chute without having to spend energy for this purpose, one will advantageously resort to the gear transmission mechanism described earlier. It remains to be noted that the inclination of the chute may also be changed without driving it into rotation. For this purpose, the suspension rotor is blocked in rotation via the second braking device and the tilt of the chute is controlled in a first direction by having the tilt controlling rotor driven by the second motor and in a second direction by braking the tilt controlling rotor via the first braking device, taking advantage of the fact that the balance of the chute makes it return to a first of two extreme positions.

In order to guarantee a substantially constant speed of rotation of the chute in said second direction of rotation, when the angle of inclination of the chute is varied by braking the suspension rotor, a variable speed drive must be associated with the second motor. With a control device associated with the variable speed drive, the desired speed of rotation of the suspension rotor may then be provided, whereas with the second control device controlling the braking moment of the suspension rotor, the desired tilting speed of the chute can be provided. Alternatively, the speed of rotation of the chute can be imposed via the second braking device and a control device can be associated with the variable speed drive of the second motor, and provide direct control over the tilting speed of the chute. It remains to be noted that in both cases, the second motor with its variable speed drive should be able to drive the tilt controlling rotor at a speed of rotation higher and less than the desired speed of rotation for the chute.

In the above description, it is assumed that the chute is balanced so that it returns to a first of its two extreme positions, while accelerating the tilt controlling rotor via the tilting mechanism in the direction of rotation of the suspension rotor. If such balancing were not possible, the device according to the invention should be equipped as follows. A first braking device is associated to the tilt controlling rotor so that it is capable of exerting a braking moment on the tilt controlling rotor. A second motor is associated with the tilt controlling rotor, so that it is capable of driving the latter about its axis in the first direction at a higher speed of rotation than the desired speed of rotation for the chute. A second braking device is associated with the suspension rotor so that it is capable of exerting a braking moment on the suspension rotor. A control device then allows the tilting of the chute to be controlled in a first direction, by driving the suspension rotor in the first direction and by controlled braking of the tilt controlling rotor by means of the first braking device, and in a second direction, by driving the tilt controlling rotor in the first direction, at a higher speed of rotation than the desired speed of rotation for the chute, and by controlled braking of the suspension rotor by means of the second braking device.

If, in the device of the above paragraph, the tilting mechanism is a perfectly self-blocking mechanism, i.e. no moment needs to be applied to said tilt controlling rotor in order to maintain the chute fixed in tilt, then it is sufficient to rotate the suspension rotor and not to brake the tilt controlling rotor in order to provide rotation of the chute with a strictly constant angle of inclination. If however the tilting mechanism is not perfectly self-blocking or if there is a risk that wear and tear will destroy its self-blocking character, it is then recommended to equip the device with a transmission mechanism having a clutch as described earlier.

If the intention is not to be limited to only one direction of rotation for the chute, the first motor needs to be able to drive the suspension rotor in a second direction of rotation at the desired speed of rotation for the chute, and the second motor should be able to drive the tilt controlling rotor in the second direction of rotation at a higher speed of rotation than the desired speed of rotation for the chute. In this case, the control device associated with the first braking device, with the second braking device and with the second motor, must be able to control the tilting of the chute: (a) in a first direction, by driving the tilt controlling rotor by means of the second motor in the second direction at a higher speed of rotation than the desired speed of rotation for the chute and by controlled braking of the suspension rotor by means of the second braking device; and (b) in a second direction, by driving the suspension rotor in the second direction and by controlled braking of the tilt controlling rotor by means of the first braking device. It remains to be noted that in this device, the inclination of the chute may also be changed without driving it into rotation. For this purpose, the rotating suspension rotor is blocked via the second braking device and the tilt of the chute is controlled, in a first direction, by having the tilt controlling rotor driven by the second motor in a first direction, in a second direction, by having the tilt controlling rotor driven by the second motor in a second direction.

In order to guarantee with the device described in the above paragraph, a substantially constant speed of rotation of the chute when the angle of inclination is varied by braking the suspension rotor, a variable speed drive should be associated with the second motor. A control device associated with the variable speed drive is then able to provide the desired speed of rotation of the suspension rotor, whereas the second control device controlling the braking moment of the suspension rotor, is able to provide the desired tilting speed of the chute. Alternatively, the speed of rotation of the chute can be imposed via the second braking device and a control device can be associated with the variable speed drive of the second motor, and then provide direct control over the tilting speed of the chute. It remains to be noted that the second motor with its variable speed drive, needs to be able to drive the tilt controlling rotor at a higher speed of rotation than the desired speed of rotation for the chute.

It is important to note that the braking device used in a device such as the one described above, for braking the tilt controlling rotor or the suspension rotor may for example be a mechanical, hydraulic, magnetic or electromagnetic brake. In a preferred embodiment of a device according to the invention, the first motor and the second, braking device, the second motor and the first braking device respectively, however form a unit comprising a rotating electric machine powered by an electrical circuit so that it is capable of operating in motor mode to develop a driving torque and in a generator mode to develop a braking torque, this in at least one direction of rotation. In other words, the first driving motor, the second driving motor respectively, also fulfills the function of an electric brake. It remains to be noted that this solution not only simplifies the construction of the device (no need to provide a separate brake) but it is also of interest from the point of view of the energy balance of the device. Indeed, the rotating electric machine operating in generator mode transforms braking power into electrical power, which it injects into the mains electric power supply network. This electrical power is then used for at least partly compensating the electrical power that the rotating electric machine operating in the motor mode absorbs in order to overcome the braking moment developed for controlling the angle of inclination of the chute.

In a preferred embodiment of a device according to the invention, the rotating electric machine is for example an electric motor equipped with a speed reducer, and the electrical circuit is a static frequency converter. These are standard cheap pieces of equipment and their replacement in the event of machine breakage will normally not be a problem.

It remains to be noted that the devices for controlling the tilt of the chute as mentioned above, may comprise different means for sensing the inclination of the chute. In a first embodiment, a first angle sensor is used which senses the angular position of the suspension rotor, a second angle sensor sensing the angular position of the tilt controlling rotor and computation means for computing the relative angular position of both rotors, and for inferring therefrom the tilt of the chute. However, better accuracy of the control device is provided when a differential angle sensor is used which directly senses the relative angular position of both motors. This accuracy may further be enhanced by connecting a differential measurement mechanism between both motors. Such a mechanism comprises e.g. a first input shaft, a second input shaft and an output shaft. The first input shaft is rotated by the suspension rotor and the second input shaft is rotated by the tilt controlling rotor. This differential measurement mechanism is dimensioned so that the output shaft is rotationally fixed when both rotors have the same speed of rotation and so that it reproduces the angle of inclination of the chute in a rotationally fixed reference system. A single angle sensor then senses the angular position of the output shaft of the differential measurement mechanism and thus detects the inclination of the chute in a rotationally fixed reference system. The tilt controlling device may also comprise a sensor for the inclination of the chute, rotating with the chute. In this case, a transmitter is associated with the rotationally mobile inclination sensor and at least one receiver is mounted in the rotationally fixed support frame. In this way, it is known how to measure the tilt of the chute directly in its rotating referential.

BRIEF DESCRIPTION OF THE DRAWINGS

Other features and characteristics of the invention will become apparent from the detailed description of a few advantageous embodiments shown below, by way of illustration, with reference to the appended drawings.

DETAILED DESCRIPTION OF THE INVENTION

In the figures, the same reference symbols refer to identical or similar components.

The device for distributing bulk materials 10 shown in FIGS. 1, 2, 4 and 5, is more particularly intended to be part of a charging device of a shaft furnace, such as a blast furnace for example. It comprises an external frame 12, which is provided with a fixed feeding sleeve 14 defining a vertical feeding channel 16. A suspension rotor 18 is suspended in the external frame 12 by means of a large diameter ball bearing 20. This suspension rotor 18 comprises a cylindrical body provided at its lower end with a horizontal flange 24, which acts as a screen between the inside of the frame 12 and the inside of the furnace. A second rotor 28, called the tilt controlling rotor 28, surrounds the suspension rotor 18 and is suspended in the external frame 12 by means of a large diameter ball bearing 26, in order to have its axis of rotation substantially coaxial to the axis of rotation of the suspension rotor 18.

Figure 1:
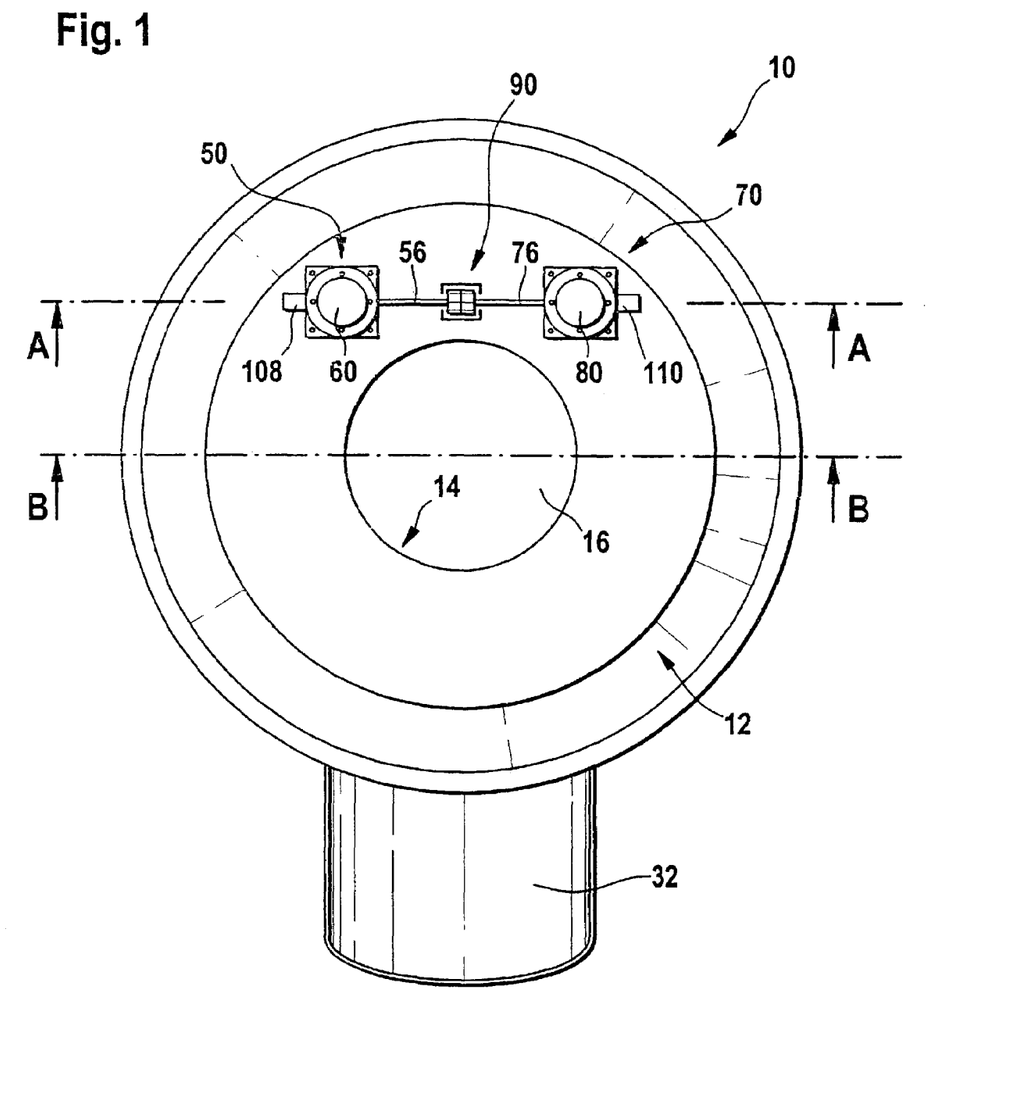
FIG. 1 shows a planar view of a device for distributing bulk materials with a rotary chute having a variable angle of inclination according to the invention.
Figure 2:
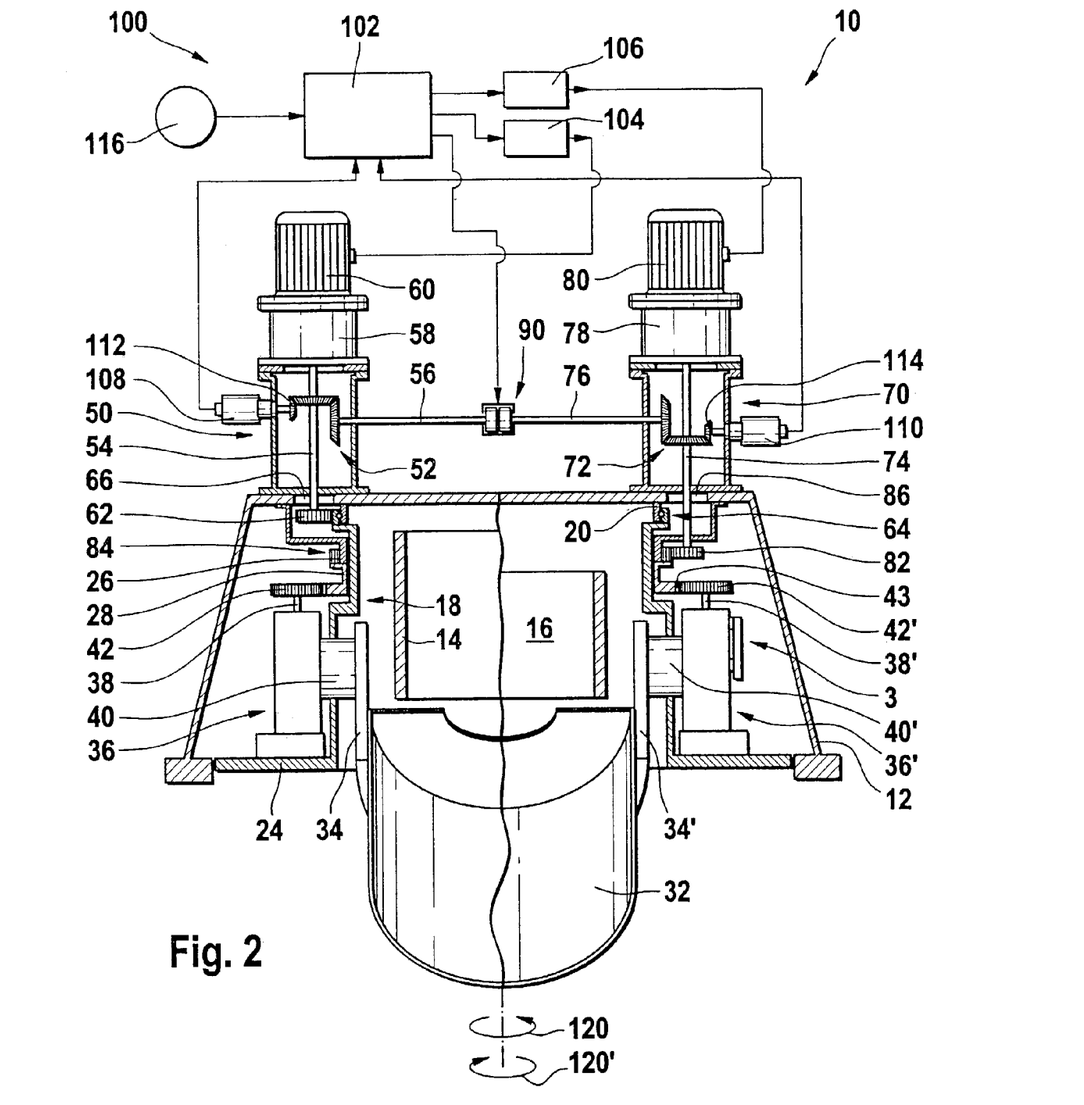
FIG. 2 shows a longitudinal sectional view through the device of FIG. 1, the upper portion being a sectional view along the sectional line A—A of FIG. 1; the lower portion being a sectional view along the sectional line B—B of FIG. 1.

Reference symbol 32 refers to a distribution chute for bulk materials poured in through the feeding channel 16. This chute 32 comprises two side suspension arms 34 and 34', by means of which it is suspended to the suspension rotor 18. With a tilting mechanism actuated by the tilt controlling rotor 28, the chute 32 can be tilted about a substantially horizontal tilt axis. In the illustrated device, this tilting mechanism comprises per suspension arm 34, 34' of the chute 32, a suspension mechanism 36, 36' borne by the suspension rotor 20. Each of both of these suspension mechanisms 36, 36', comprises a vertical input shaft 38, 38', an internal gear system (not shown) and a horizontal suspension pin 40,40'. Both side suspension arms 34, 34' of the chute 32.are coupled with suspension pins 40,40' and the latter define a substantially horizontal tilt axis for the chute 32. The vertical input shaft 38, 38' of each of both suspension mechanisms 36, 36' is equipped with a pinion which engages with a toothed crown 43 of the tilt controlling rotor 28. The internal gear system transforms a rotation of the vertical input shaft 38, 38' into a rotation of the suspension pin 40,40'. It will be noted that both suspension mechanisms 36 and 36' should be symmetrical with respect to the middle plane of the chute 32, i.e. a rotation in the same direction as the input shaft 38, 38', should result in a rotation in opposite directions of both suspension pins 40,40'.

It is important to note that other tilting mechanisms connected to the chute and actuated by the tilt controlling rotor are also known. Thus, U.S. Pat. No. 4,941,792 for example proposes the use as a tilting mechanism, respectively of a forked tilting lever connected between both pins and the tilt controlling rotor, or of a toothed ring segment which cooperates with a toothed sector interdependent with one of both of the pins of the chute. U.S. Pat. No. 5,002,806 proposes the connection of the rotor by means of a rod with spherical joints, with a lever connected to one of the pins of the chute. Other tilting mechanisms are also known from WO95/21072, U.S. Pat. No. 4,368,813, U.S. Pat. No. 3,814, 403 and U.S. Pat. No. 3,766,868.

Reference symbol 50 refers to a first casing mounted on the support frame 12. This casing 50 contains a vertical shaft 54, called a rotation shaft 54 hereafter, which is connected through a angular gear transmission mechanism 52 to a horizontal output shaft 56. The upper end of the rotary shaft 54 is coupled via a mechanical reducer 58 with an electric motor 60. The lower end of the rotary shaft 54 sealably emerges out through the base plate of the casing 50 and is provided with a pinion 62 which engages with a toothed crown 64 of the suspension rotor 18. It remains to be noted that the support frame 12 is provided with a port 66 for the passage of the pinion 62, which is sealably closed by the base plate of the casing 50. Reference symbol 70 refers to a second casing mounted on the support frame 12. This casing 70 contains a vertical shaft 74, hereafter called the tilt controlling shaft 74 which is connected by a angular gear transmission mechanism 72 to a horizontal input shaft 76. The upper end of the rotary shaft 74 is coupled via a mechanical reducer 78 with an electric motor 80. The lower end of the tilt controlling shaft 74 sealably emerges out through the base plate of the casing 70 and is provided with a pinion 82 which engages with a toothed crown 84 of the control rotor 26. It remains to be noted that the support frame 12 is also provided with a port 86 for the passage of the pinion 82, which is sealably closed by the base plate of the casing 70. The horizontal output shaft 56 of the casing 50 and the horizontal input shaft 76 of the casing 70 are coupled with each other by means of a clutch 90. When the clutch 90 is in the engaged position, both rotors 18, 28 are interdependent in rotation, i.e. it is impossible to accelerate or decelerate one of the rotors 18, 28 relatively to the other. Further, the different gear ratios are dimensioned in such a way that the speeds of rotation of both rotors 18, 28 are strictly identical in this case. In order to accelerate or decelerate one of the rotors 18, 28 with respect to the other, the clutch must therefore be disengaged 90.

The reference symbol 100 globally refers to a control system controlling the device for distributing bulk materials 10. This control system 100 comprises a control central unit 102 comprising for example a programmable controller, which controls the electric motor 60 via a first variable speed drive 104 and the electric motor 80 via a second variable speed drive 106. As feedback signals, the control central unit 102 receives signals from two angle sensors 108 and 110. The angle sensor 108 senses via a gear 112 the angular position of the rotary shaft 54 consequently that of the tilt controlling rotor 28. By means of the signal from the angle sensor 108, the central unit 102 computes the instantaneous speed of rotation of the chute 32, as well as its position. On the; basis of the signal from both angle sensors 108 and 110, the central unit 102 computes the inclination of the chute and the instantaneous tilting speed of the chute 32. A set point unit 116 enables set values to be entered into the control central unit 102 as regards notably the speed of rotation, the inclination and the tilting speed of the chute 32.

The operation of the device for distributing bulk materials 10 will now be described in more detail.

First of all, let us assume that the chute 32 is balanced so that it is capable of tilting under the effect of it own weight in a quasi-vertical position (i.e. in a position at which its angle of inclination, as measured with respect to the vertical, is minimal), and that the tilting mechanism is dimensioned so that it is capable of respectively accelerating the tilt controlling rotor in the direction of the arrow 120 and the suspension rotor in the direction of the arrow 120', when the chute 32 returns under the effect of its own weight to a position of minimal inclination this notably means that a moment must be applied to the tilt controlling rotor 28 in order to maintain the latter in equilibrium for a given angle of inclination. Let us also assume that the chute 32 should be rotated at speed N in the direction of the arrow 120. To increase the angle of inclination of the chute 32 as measured with respect to the vertical, the variable speed drive 10106 has the electric motor 80 operate as a generator which imposes a braking moment to the tilt controlling rotor 28, whereas the motor 60 drives the suspension rotor 18 at speed N in the direction of the arrow 120. Indeed, if the braking moment exerted by tilt controlling rotor becomes greater than the moment required for maintaining the chute in the equilibrium position, the tilt controlling rotor 28 decelerates with respect to the suspension rotor and the angle of inclination of the chute 32 as measured with respect to the vertical, increases. The more the braking moment exerted by the tilt controlling rotor 28 exceeds the equilibrium moment of the chute 32, the higher the deceleration of the tilt controlling rotor 28 with respect to the suspension rotor 18 and the faster the tilting speed of the chute 32. Of course, it is motor 60 which drives the suspension rotor 18, which must provide the required power for overcoming the braking moment applied on the tilt controlling rotor 28 in order to decelerate the latter. This power is partly compensated by the electrical power which the variable speed drive 10, 106 injects into the mains electrical power supply network, when the motor 80 operates as a generator for generating the braking moment of the tilt controlling rotor 28. If the intention is to maintain the chute 32 in rotation at speed N in the direction of the arrow 120 with a constant angle of inclination, the braking moment of the motor 80 must be set by means of the variable speed drive 106 so that the speed of rotation of the tilt controlling rotor 28 is substantially identical to the speed of rotation N of the suspension rotor 18. When the speeds of rotation of both rotors 18, 28 are quasi identical, the clutch 90 is engaged. From this moment, both rotors 18, 28 are interdependent in rotation and rotate at the same speed. The angle of inclination of the chute 32 is frozen at its value at the time of the engagement. Motor 80 has no longer to develop a braking torque, it is capable of consequently rotate idly. As a result the motor 60 does no longer need to overcome the braking moment of the tilt controlling rotor 28, which means that its absorbed power is considerably reduced. To reduce once again the inclination of the chute 32 with respect to the vertical, the clutch 90 is simply disengaged. The tilt controlling rotor 28 undergoes, by a particular balance of the chute 32, an acceleration in the directions of the arrow 120, which reduces the delay of the tilt controlling rotor 28 relatively to the suspension rotor 18. As a result, the angle of inclination of the chute 32 with respect to the vertical, is again reduced. To control the tilting speed of the chute 32 towards its position of minimal angle of inclination, the control central unit 102 may operate the electric motor 80 via the variable speed drive 106 as a generator, which imposes a braking moment to the tilt controlling rotor. This braking moment should of course, remain smaller than the moment required for maintaining the chute 32 in its equilibrium position. Now let us assume that the chute 32 should rotate at speed N in the opposite direction, i.e. in the direction of the arrow 120'. In order to increase the angle of inclination of the chute 32 as measured with respect to the vertical, the variable speed drive 106 operates the electric motor 80 so that it drives the tilt controlling rotor 28 at a speed N'>N in the direction of the arrow 120', and the variable speed drive 104 operates the electric motor 60 as a generator, which imposes a braking moment to the suspension rotor 18. By means of the variable speed drive 106, the control unit 102 controls the driving speed N' of the tilt controlling rotor 28, in order to adjust the tilting speed of the chute 32 to the desired value. By means of the variable speed drive 104, the control unit 102 controls the motor 60 so that the speed of rotation of the suspension rotor 18 remains substantially equal to the desired value N. Now, it is the motor 80 which must provide the power required for overcoming the braking moment applied to the suspension rotor 18 in order to maintain the latter at the speed of rotation N. This power is partly compensated by the electrical power that the variable speed drive 104 injects into the mains electrical supply network, when motor 60 operates as a generator for generating the braking moment of the suspension rotor 18. If the intention is to maintain the chute 32 rotating at speed N, in the direction of the arrow 120', with a constant angle of inclination, the braking moment of the tilt rotor 28 should be set by means of the variable speed drive 106 until a zero tilting speed is obtained. A this moment, the speed of rotation of the tilt controlling rotor 28 is the same as the speed of rotation N of the suspension rotor 18 and clutch 90 is engaged. Both rotors 18, 28 are now interdependent in rotation and rotate at the same speed. Motor 60 has no need to develop a braking torque; it is capable of rotating idly. As a result, motor 80 has no longer to overcome the braking moment of the suspension rotor 18 which means that its absorbed power is considerably reduced. It remains to be noted that if clutch 90 is engaged, the motor 60 can be also used for driving the chute into rotation in the direction of the arrow 120' at speed N. To again reduce the inclination of the chute 32 with respect to the vertical, clutch 90 is first disengaged. The suspension rotor 18 is subject, by the particular balance of the chute 32, to a driving moment in the directions of the arrow 120', which tends to accelerate it in the direction of rotation. By means of the variable speed drive 104, the control unit 102 sets the braking moment of the suspension rotor 18 to adjust the speed of rotation of the chute 32 to the desired value N. By means of the variable speed drive 106, the control unit 102 sets the driving moment of the tilt controlling rotor 28 in order to adjust the tilt speed of the chute 32 to the desired value. If the speed of rotation N' of the tilt controlling rotor 28 is less than the speed of rotation N of the suspension rotor 18, then the angle of inclination of the chute 32 with respect to the vertical is reduced.

If it is not required to drive the chute 32 into rotation in the direction of the arrow 120', the "motor 80" should only fulfill the function of a brake capable of exerting a braking moment on the tilt controlling rotor 28. In this event, of course, the motor 80 its inverter 106 can be replaced with a mechanical, hydraulic, magnetic or electromagnetic braking device, equipped with a suitable control device for controlling the variation of the angle of inclination of the chute 32 by controlled braking of the tilt controlling rotor 28. It is then possible to do without the variable speed drive which powers the motor, provided that the latter is able to deliver a substantially constant speed of rotation when it has to overcome a variable braking torque.

It remains to be noted that instead of balancing the chute so that it tilts under the effect of its own weight into a position at which its angle of inclination as measured with respect to the vertical, is minimal, it might be also balanced so that it tilts under the effect of a counterweight into a position at which its angle of inclination, as measured with respect to the vertical, is maximal. Finally, for balancing the chute so that it returns into a position at which its angle of inclination with respect to the vertical is either maximal or minimal, it is also possible to resort to springs or hydraulic cylinders capable of storing potential energy when the chute is tilted in one direction and of releasing it when the chute must be tilted in the reverse direction.

Let us now assume that the tilting mechanism is self-blocking, i.e. that no moment needs to be applied to the tilting control motor in order to maintain the angle of inclination of the chute constant. Again let us assume that the chute 32 should be rotated at speed N in the sense of the arrow 120. To increase the angle of inclination of the chute 32 as measured with respect to the vertical, the variable speed drive 106 operates the electrical motor 80 as a generator, which imposes a braking moment to the tilt controlling rotor 28, whereas motor 60 drives the suspension rotor 18 at speed N in the direction of the arrow 120. Indeed, if the braking moment exerted on the tilt controlling rotor becomes larger than a certain value, the tilt controlling rotor 28 decelerates relatively to the suspension rotor 18 and the angle of inclination of the chute 32 as measured with respect to the vertical, increases. The larger the deceleration of the tilt controlling rotor 28 with respect to the suspension rotor 18, the higher the tilting speed of the chute 32. Of course, it is motor 60 which must provide the power required for overcoming the braking moment applied to the tilt controlling rotor 28 in order to decelerate the latter. This power is partly compensated by the electrical power that the variable speed drive 106 injects into the mains electrical power supply network, when motor 80 operates as a generator for producing the braking moment of the tilt controlling rotor 28. To keep the chute 32 rotating at speed N in the direction of the arrow 120 with a constant angle of inclination, it is sufficient to operate the motor 80 under no load. However, if the tilting mechanism is not perfectly self-blocking for all the angles of inclinations of the chute, it is then recommended to engage the clutch 90 nonetheless, in order to provide a strictly constant angle of inclination for the chute 32. To reduce the inclination of the chute 32 with respect to the vertical, the variable speed drive 106 operates the electric motor 80 so that it drives the tilt controlling rotor 28 at a speed N'>N in the direction of the arrow 120, and the variable speed drive 104 operates the electric motor 60 as a generator, which imposes a braking moment to the suspension rotor 18. By means of a variable speed drive 104, the control unit 102 sets the braking moment of the suspension rotor 18 in order to adjust the speed of rotation of the chute 32 to the desired value N. By means of the variable speed drive 106, the control unit 102 sets the speed of rotation N' of the tilting rotor 28 in order to adjust the tilting speed of the chute 32 to the desired value. Let us now assume that the tilting mechanism is self-blocking and that the chute 32 needs to be rotated at speed N in the direction of the arrow 120'. To increase the inclination of the chute 32 with respect to the vertical, the variable speed drive 106 operates the electric motor 80 so that it drives the tilt controlling rotor 28 at a speed N'>N in the direction of the arrow 120', and the variable speed drive 104 operates the electric motor 60 as a generator which imposes a braking moment to the suspension rotor 18. By means of the variable speed drive 104, the control unit 102 sets the braking moment of the suspension rotor 18 in order to adjust the speed of rotation of the chute 32 to the desired value N. By means of the variable speed drive 106, the control unit 102 sets the tilting speed of the chute 3. In order to reduce the tilt of the chute 32 with respect to the vertical, the variable speed drive 104 operates the electric motor 60 so that it drives the suspension rotor 18 at speed N in the direction of the arrow 120', and the variable speed drive 106 operates the electric motor 80 as a generator which imposes a braking moment to the tilt controlling rotor 28. By means of the variable speed drive 106, the control unit 102 sets the braking moment of the tilt controlling rotor 28 in order to adjust the tilting speed of the chute 32 to the desired value. By means of the variable speed drive 104, the control unit 102 sets the speed of rotation of the suspension rotor 18 to the value N.

Figure 3:
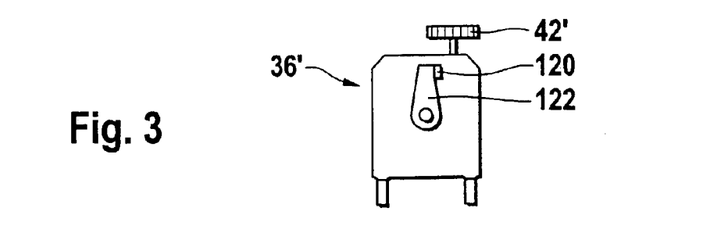
FIG. 3 is an elevational view of a detail which is identified by arrow 3 in FIG. 2.

Upon its assembly or during maintenance work, the angle sensor 110 must be reset, i.e. an initial count value must be associated with a well-defined angle of inclination of the chute 32. With reference to FIG. 3, it is seen that the suspension mechanism 36' is equipped with an angle abutment 120 and with a lever 122 interdependent with the suspension pin 40'. To reset the angle sensor 110, the tilt rotor 28 is driven by means of motor 80 in order to have the lever 122 abut against the angle abutment 120.

Figure 4:
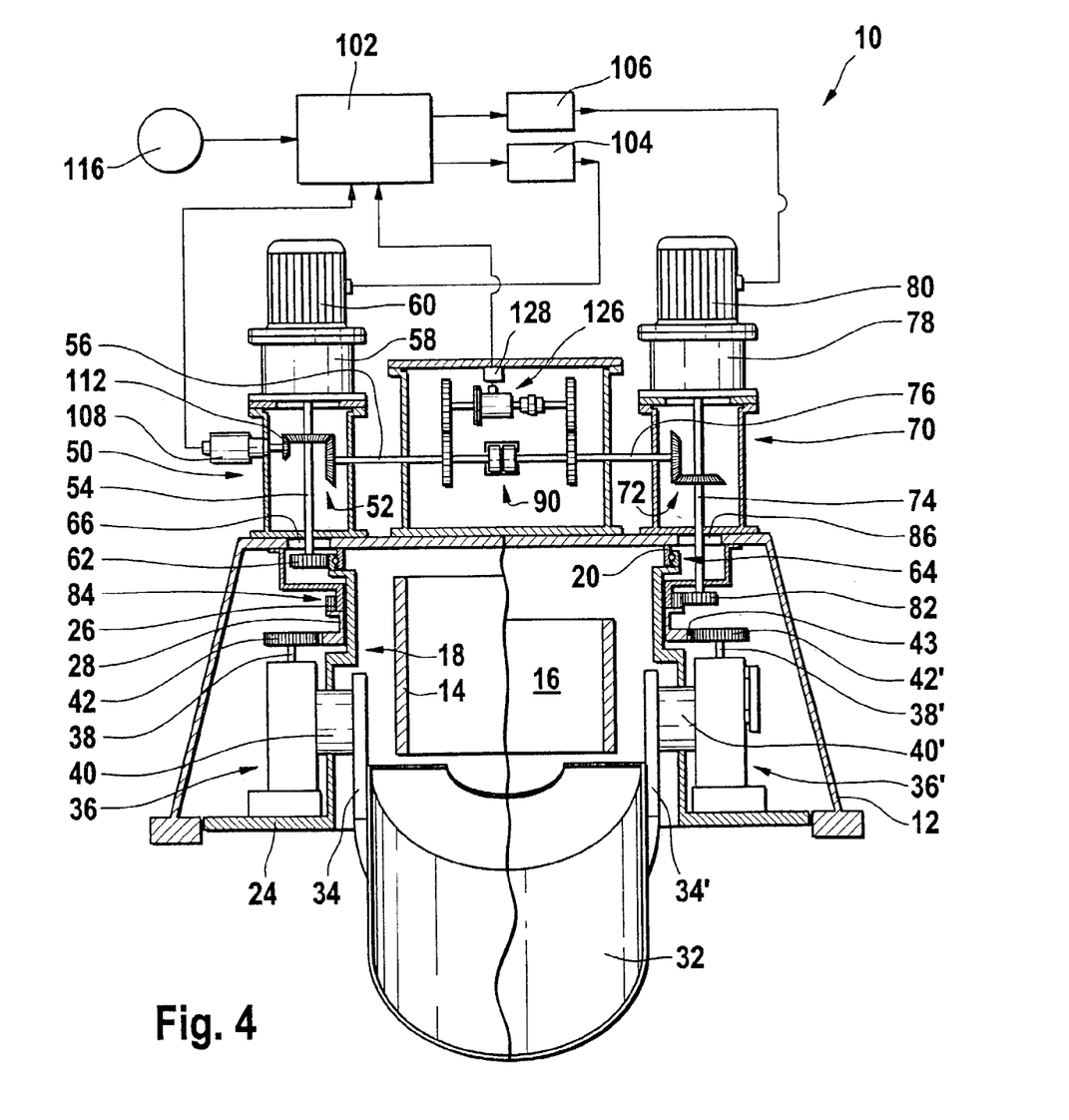
FIG. 4 is a longitudinal sectional view similar to that of FIG. 2, through a first alternative embodiment of a device for distributing bulk materials with a rotary chute having a variable angle of inclination according to the invention.

In the embodiment of FIG. 4, a differential angle sensor 126 is used which directly senses the angular position relatively to both rotors 18 and 28. This differential angle sensor 126 is mounted in parallel on the clutch 90. If the device does not comprise a clutch 90 because the tilting mechanism of the chute is perfectly self-blocking, then the differential angle sensor 126 may take the place of the clutch 90, so as to be directly connected between both shafts 56 and 76. Considering that the casing of the differential angle sensor 126 is also rotating, a wireless transmission of measurements towards a receiver 128 which is rotationally fixed, is provided advantageously.

Figure 5:
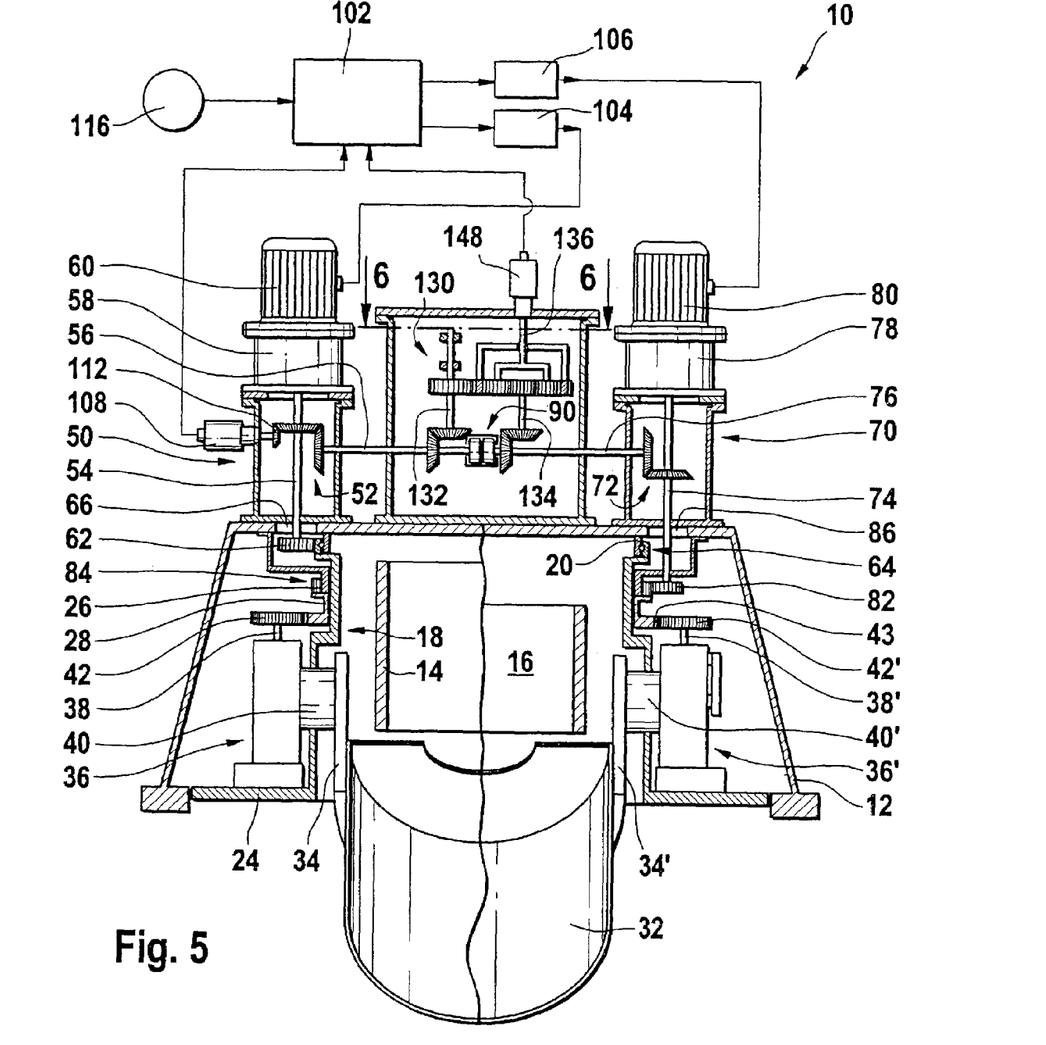
FIG. 5 is a longitudinal sectional view similar to that of FIG. 2, through a second alternative embodiment of a device for distributing bulk materials with a rotary chute having a variable angle of inclination according to the invention.

In the embodiment of FIG. 5, a differential measurement mechanism 130 is used, which is connected in parallel on the clutch 90. This mechanism comprises a first input shaft 132, a second input shaft 134 and an output shaft 136. The first input shaft is rotated by the output shaft 56 of the casing 50. It consequently senses the angular position of the suspension rotor 18. The second input shaft is rotated by the input shaft 76 of the casing 70. It consequently senses the angular position of the tilt controlling rotor 28. This differential measurement mechanism 130 additionally comprises a system of planetary gears dimensioned in order that the output shaft 136 is rotationally fixed when both rotors 18, 28 have the same speed of rotation, so that it reproduces the angle of inclination of the chute 32 in a rotationally fixed reference system.

Figure 6:
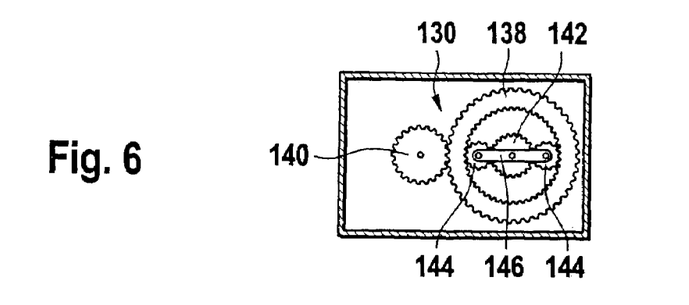
FIG. 6 is a transverse sectional view, the sectional line of which is identified by arrows 6—6 in FIG. 5.

FIG. 6 shows a planar view of this planetary gear system. A horizontal annular toothed wheel 138 is seen, which engages on its external perimeter with a pinion 140 of the first input shaft 132; a solar wheel 142 which is borne by the second input shaft 134; two satellite pinions 144 which engage with the internal perimeter of the annular toothed wheel 138 and the solar wheel 142; and a satellite pinion support 146, with which is coupled the output shaft 136. A single angular sensor 148 then senses the angular position of the output shaft 136 and thereby detects the tilt of the chute in a rotationally fixed reference system.

The invention claimed is:

1. A device for distributing bulk materials comprising:
   a support frame;
   a distribution chute for the bulk materials;
   a suspension rotor mounted in said support frame so as to be capable of rotating about a substantially vertical axis of rotation, said chute being suspended to said suspension rotor so as to be tiltable about a substantially horizontal tilt axis;
   a first motor able to rotate said suspension rotor about its axis of rotation in a first direction;
   a tilt controlling rotor mounted in said support frame so that it is capable of rotating about a substantially vertical axis of rotation; and
   a tilting mechanism connected between said chute and said tilt controlling rotor, said tilting mechanism being designed in order to transform a differential rotation of said suspension rotor and of said tilt controlling rotor into a variation of the angle of inclination of said chute between two extreme positions, wherein said chute is balanced so that it returns to a first of said two extreme positions, while accelerating said tilt controlling rotor via said tilting mechanism in the direction of rotation of said suspension rotor;
   a first braking device associated with said tilt controlling rotor so that it is capable of exerting a braking moment on said tilt controlling rotor; and
   a first control device associated with said first braking device in order to control the variation of the angle of inclination of said chute by controlled braking of said tilt controlling rotor.

2. The device according to claim 1, further comprising:
   a transmission mechanism including a clutch which is connected between said suspension rotor and said tilt controlling rotor, so that in an engaged position of said clutch, said mechanism makes both rotors interdependent in rotation while providing equal speeds of rotation for both rotors.

3. The device according to claim 1, further comprising:
   a second motor which is associated with said tilt controlling rotor so that it is capable of driving the latter about its axis of rotation in a second direction of rotation, opposite to said first direction of rotation;
   a second braking device which is associated with said suspension rotor so that it is capable of exerting a braking moment on said suspension rotor.

4. The device according to claim 3, further comprising:
   a second control device which is associated with said second braking device, in order to control the variation of the angle of inclination of said chute rotating in said second direction by varying the braking moment of said suspension rotor.

5. The device according to claim 4, further comprising:
   a variable speed drive associated with said second motor; and a control device associated with said variable speed drive in order to control the speed of rotation of said suspension rotor, by varying the speed of rotation of said tilt controlling rotor.

6. The device according to claim 3, further comprising:
a variable speed drive associated with said second motor; and
a control device associated with said variable speed drive in order to control the speed of tilting of said chute by varying the speed of rotation of said tilt controlling rotor with the speed of rotation of said suspension rotor being kept constant.

7. The device according to claim 3, wherein:
said first motor and said second braking device, said second motor and said first braking device, respectively, form a unit comprising a rotating electric machine powered by an electrical circuit so that it is capable of operating in motor mode, developing a driving torque, and capable of operating in generator mode, developing a braking torque in at least one direction of rotation.

8. The device according to claim 7, wherein:
said electric rotating machine is an electric motor equipped with a speed reducer, and
said electric circuit is a static frequency converter.

9. The device according to claim 1, wherein said first control device, said second control device, respectively, comprises:
a first angle sensor sensing the angular position of said suspension rotor;
a second angle sensor sensing the angular position of said tilt controlling rotor; and
computation means for computing the relative angular position of both rotors.

10. The device according to claim 1, wherein said first control device, said second control device, respectively, comprises:
a differential angle sensor sensing the angular position of both rotors.

11. The device according to claim 1, wherein said first control device, said second control device, respectively, comprises:
a differential measurement mechanism, with a first input shaft, a second input shaft and an output shaft, said first input shaft being rotated by said suspension rotor, said second input shaft being rotated by said tilt controlling rotor, and said differential measurement mechanism being dimensioned so that said output shaft is rotationally fixed when both rotors have the same speed of rotation; and
an angle sensor sensing the angular position of said output shaft.

12. A device for distributing bulk materials comprising:
a support frame;
a distribution chute for the bulks materials;
a suspension rotor mounted in said support frame so that it is capable of rotating about a substantially vertical axis of rotation, said chute being suspended to said suspension rotor so as to be tiltable about a substantially horizontal tilt axis;
a first motor able to rotate said suspension rotor about its axis of rotation in a first direction;
a tilt controlling rotor mounted in said support frame so that it is capable of rotating about a substantially vertical axis of rotation; and a tilting mechanism connected between said chute and said tilt controlling rotor, said tilting mechanism being designed so as to transform a differential rotation of said suspension rotor and said tilt controlling rotor into a variation of the angle of inclination of said chute between two extreme positions;
a first braking device associated with said tilt controlling rotor so that it is capable of exerting a braking moment on said tilt controlling rotor;
a second motor associated with said tilt controlling rotor so that it is capable of driving the latter about its axis of rotation in said first direction at a higher speed of rotation than the desired speed of rotation for said chute;
a second braking device associated with said suspension rotor so that it is capable of exerting a braking moment on said suspension rotor; and
a control device cable of controlling the tilting of said chute:
a) in a first direction, by driving said suspension rotor in said first direction and by braking of said tilt controlling rotor in a controlled manner by means of said first braking device, and
b) in a second direction, by driving said tilt controlling rotor in said first direction at a higher speed of rotation than the desired speed of rotation for said chute and by braking of said suspension rotor in a controlled manner by means of said second braking device.

13. A device for distributing bulk materials comprising:
The device according to claim 12, wherein said tilting mechanism is a self-blocking mechanism.

14. The device according to claim 12, further comprising:
a transmission mechanism with a clutch which is connected between said suspension rotor and said tilt controlling rotor, so that in the engaged position of said clutch, said mechanism makes both rotors interdependent in rotation by providing equal speeds of rotation for both rotors.

15. The device according to claim 12, wherein:
said first motor is able to drive said suspension rotor in a second direction of rotation opposite to said first direction of rotation, at the desired speed of rotation for said chute; and said second motor is able to drive said tilt controlling rotor in a second direction of rotation, at a higher speed of rotation than the desired speed of rotation for said chute.

16. The device according to claim 13, wherein, upon a rotation of said chute in said second direction, said control device associated with said first braking device, with said second braking device and with said second motor, is capable of controlling the tilting of said chute:
(a) in a first direction, by driving said tilt controlling rotor by means of said second motor in said second direction with a higher speed of rotation than the desired speed of rotation for said chute and by braking of said suspension rotor in a controlled manner by means of said second braking device; and
(b) in a second direction, by driving said suspension rotor in said second direction and by braking of said tilt controlling rotor in a controlled manner by means of said first braking device.

17. The device according to claim 12, wherein:
a variable speed drive is associated with said second motor; and said control device is able to control said variable speed drive in order to control the speed of rotation of said suspension rotor, by varying the speed of rotation of said tilt controlling rotor.

18. The device according to claim 12, wherein:
a variable speed drive is associated with said second motor; and
said control device is able to control said variable speed drive in order to control the tilting speed of said chute by varying the speed of rotation of said tilt controlling rotor.

19. The device according to claim 12, wherein said first motor and said second braking device, said second motor and said first braking device respectively, form a unit comprising a rotating electric machine powered by an electrical circuit so that said unit is capable of operating in motor mode, developing a driving torque, and in generator mode developing a braking torque, in at least one direction of rotation.

20. The device according to claim 19, wherein:
said rotating electric machine is an electric motor equipped with a speed reducer, and
said electrical circuit is a static frequency converter allowing operation of said rotating electric machine in four quadrants of the speed of rotation/developed torque diagram.

21. The device according to claim 12, wherein said control device comprises:
a first angle sensor sensing the angular position of said suspension rotor;
a second angle sensor sensing the angular position of said tilt controlling rotor; and computation means for computing the relative angular position of both rotors.

22. The device according to claim 12, wherein said control device comprises:
a differential angle sensor sensing the relative angular position of both rotors.

23. The device according to claim 12, wherein said control device comprises:
a differential measurement mechanism with a first input shaft, a second input shaft and an output shaft, said first input shaft being rotated by said suspension rotor, said second input shaft being rotated by said tilt controlling rotor, and said differential measurement mechanism being dimensioned so that said output shaft is rotationally fixed when both rotors have the same speed of rotation; and
an angle sensor sensing the angular position of said output shaft.

24. The device according to claim 12, wherein said control device comprises:
an inclination sensor for said chute rotating with said chute, a transmitter associated with said inclination sensor and at least one receiver mounted fixedly in rotation in said support frame.

* * * * *